US011165063B2

(12) United States Patent
Volkov et al.

(10) Patent No.: US 11,165,063 B2
(45) Date of Patent: Nov. 2, 2021

(54) PROCESS FOR MAKING CATHODE MATERIALS FOR LITHIUM ION BATTERIES

(71) Applicant: BASF SE, Ludwigshafen (DE)

(72) Inventors: Aleksei Volkov, Ludwigshafen (DE); Jordan Lampert, Cleveland, OH (US); Thomas Michael Ryll, Heddesheim (DE); Ji-Yong Shin, Mannheim (DE); Markus Hoelzle, Kirchheim (DE); Michael Eder, Wattenheim (DE)

(73) Assignee: BASF SE, Ludwigshafen am Rhein (DE)

(*) Notice: Subject to any disclaimer, the term of this patent is extended or adjusted under 35 U.S.C. 154(b) by 0 days.

(21) Appl. No.: 16/509,749

(22) Filed: Jul. 12, 2019

(65) Prior Publication Data
US 2019/0386305 A1 Dec. 19, 2019

Related U.S. Application Data

(63) Continuation of application No. 15/318,887, filed as application No. PCT/EP2015/063797 on Jun. 19, 2015, now Pat. No. 10,468,678.

(30) Foreign Application Priority Data

Jun. 30, 2014 (EP) .................................... 14174991

(51) Int. Cl.
H01M 4/02 (2006.01)
H01M 4/525 (2010.01)
(Continued)

(52) U.S. Cl.
CPC .......... H01M 4/525 (2013.01); C01G 53/006 (2013.01); C01G 53/50 (2013.01); H01M 4/131 (2013.01);
(Continued)

(58) Field of Classification Search
None
See application file for complete search history.

(56) References Cited

U.S. PATENT DOCUMENTS

2006/0093920 A1* 5/2006 Cheon .................. H01M 4/525
429/232
2010/0062339 A1 3/2010 Pan et al.
(Continued)

FOREIGN PATENT DOCUMENTS

CN 102299299 A 12/2011
CN 103682319 A 3/2014
(Continued)

OTHER PUBLICATIONS

International Search Report dated Aug. 7, 2015 in PCT/EP2015/063797.
(Continued)

Primary Examiner — Jacob B Marks
(74) Attorney, Agent, or Firm — Finnegan, Henderson, Farabow, Garrett & Dunner LLP

(57) ABSTRACT

Process for making a particulate material of general formula (I), $$Li_{1+x}(Ni_aCo_bMn_cM_d)_{1-x}O_2 \quad (I)$$

wherein the integers are defined as follows:
M is selected from Al and Ti,
x is in the range of from 0.015 to 0.03,
a is in the range of from 0.3 to 0.6,
b is in the range of from 0.05 to 0.35,
c is in the range of from 0.2 to 0.5,
d is in the range of from 0.001 to 0.03,
with $a+b+c+d=1$
said process comprising the following steps:
(a) co-precipitating a mixed hydroxide of nickel, cobalt and manganese from a solution of water-soluble salts of
(Continued)

nickel, cobalt and manganese by contacting such solution with a solution of alkali metal hydroxide, (b) adding an aqueous solution of an aluminate or titanate and thereby co-precipitating a layer of a mixed hydroxide of nickel and cobalt and manganese and aluminium or titanium on the particles formed in step (a), (c) removing particles of $(Ni_aCo_bMn_cAl_d)(OH)_{2+d}$ or $(Ni_aCo_bMn_cTi_d)(OH)_{2+2d}$ so obtained and drying them in the presence of oxygen, (d) mixing the particles obtained in step (c) with at least one Li compound selected from $Li_2O$, LiOH and $Li_2CO_3$, (e) calcining the mixture obtained according to step (d) at a temperature in the range of from 920 to 950° C.

8 Claims, 1 Drawing Sheet

(51) Int. Cl.
| | | |
|---|---|---|
| H01M 10/0567 | (2010.01) | |
| H01M 10/42 | (2006.01) | |
| C01G 53/00 | (2006.01) | |
| H01M 4/131 | (2010.01) | |
| H01M 4/505 | (2010.01) | |
| H01M 10/0525 | (2010.01) | |
| H01M 10/052 | (2010.01) | |

(52) U.S. Cl.
CPC ....... *H01M 4/505* (2013.01); *H01M 10/0525* (2013.01); *H01M 10/0567* (2013.01); *H01M 10/4235* (2013.01); *C01P 2002/50* (2013.01); *C01P 2002/88* (2013.01); *C01P 2004/32* (2013.01); *C01P 2004/51* (2013.01); *C01P 2004/54* (2013.01); *C01P 2004/61* (2013.01); *C01P 2006/12* (2013.01); *C01P 2006/40* (2013.01); *H01M 10/052* (2013.01); *H01M 2004/028* (2013.01); *H01M 2300/0025* (2013.01)

(56) References Cited

U.S. PATENT DOCUMENTS

| | | |
|---|---|---|
| 2013/0330637 A1 | 12/2013 | Matsumoto et al. |
| 2014/0377635 A1* | 12/2014 | Matsumoto ....... H01M 10/0525 429/163 |
| 2014/0377660 A1 | 12/2014 | Fukui et al. |

FOREIGN PATENT DOCUMENTS

| | | |
|---|---|---|
| JP | 11-317232 A | 11/1999 |
| JP | 2006-202647 A | 8/2006 |
| JP | 2007-91573 A | 4/2007 |
| JP | 2007-123255 A | 5/2007 |
| JP | 2008-288005 A | 11/2008 |
| WO | WO 2014/136780 A1 | 9/2014 |

OTHER PUBLICATIONS

International Preliminary Report on Patentability and Written Opinion dated Sep. 27, 2016 in PCT/EP2015/063797.
Search Report dated Sep. 24, 2014 in European Patent Application No. 14 17 4991.
L. Croguennec, et al., "Effect of Aluminum Substitution on the Structure, Electrochemical Performance and Thermal Stability of $Li_{1+x}(Ni_{0.40}Mn_{0.40}Co_{0.20-z}Al_z)_{1-x}O_2$,", Journal of The Electrochemical Society, vol. 158, No. 6, 2011, pp. A664-A670.
Kinson C. Kam, et al., "Aliovalent titanium substitution in layered mixed Li Ni—Mn—Co oxides for lithium battery applications", Journal of Materials Chemistry, vol. 21, No. 27, 2011, pp. 9991-9993.
Kinson C. Kam, et al., "Electronic Supplementary Information for Aliovalent Titanium Substitution on Layered Mixed Ni—Mn—Co Oxides for Lithium-ion Battery Applications", Journal of Materials Chemistry, XP055142001, 2011, pp. 1-3.

* cited by examiner

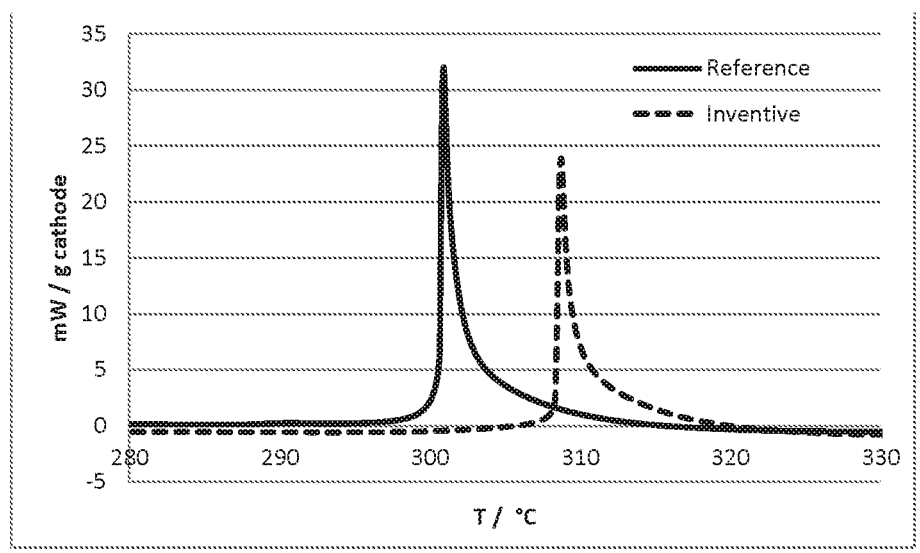

PROCESS FOR MAKING CATHODE MATERIALS FOR LITHIUM ION BATTERIES

CROSS REFERENCE TO RELATED APPLICATIONS

The present application is a continuation of U.S. patent application Ser. No. 15/318,887, filed Dec. 14, 2016, the entire disclosure of which is incorporated herein by reference and which is a 35 U.S.C. § 371 national stage patent application of international patent application PCT/EP2015/063797, filed Jun. 19, 2015, the entire disclosure of which is incorporated herein by reference and which claims priority to European Patent Application No. 14174991.1, filed Jun. 30, 2014, the entire disclosure of which is incorporated herein by reference.

The present invention is directed towards a process for making a particulate material of general formula (I), $$Li_{1+x}(Ni_aCo_bMn_cAl_d)_{1-x}O_2 \quad (I)$$

wherein
x is in the range of from 0.015 to 0.03,
a is in the range of from 0.3 to 0.6,
b is in the range of from 0.05 to 0.35,
c is in the range of from 0.2 to 0.5,
d is in the range of from 0.001 to 0.03,
with a+b+c+d=1
said process comprising the following steps:
(a) co-precipitating a mixed hydroxide of nickel, cobalt and manganese from a solution of water-soluble salts of nickel, cobalt and manganese by contacting such solution with a solution of alkali metal hydroxide,
(b) adding an aqueous solution of an aluminate and thereby co-precipitating a layer of a mixed hydroxide of nickel and cobalt and manganese and aluminium on the particles formed in step (a),
(c) removing particles of $(Ni_aCo_bMn_cAl_d)(OH)_{2+d}$ so obtained and drying them in the presence of oxygen,
(d) mixing the particles obtained in step (c) with at least one Li compound selected from $Li_2O$, LiOH and $Li_2CO_3$,
(e) calcining the mixture obtained according to step (d) at a temperature in the range of from 920 to 950° C.

Furthermore, the present invention is directed to particulate materials and their use in lithium ion batteries.

Lithiated transition metal oxides with layered structures are currently being used as electrode materials for lithium-ion batteries. Extensive research and developmental work has been performed in the past years to improve properties like charge density, energy, but also other properties like the reduced cycle life and capacity loss that may adversely affect the lifetime or applicability of a lithium-ion battery.

In a usual process for making cathode materials for lithium-ion batteries, first a so-called precursor is being formed by co-precipitating the transition metals as carbonates, oxides or preferably as hydroxides that may or may not be basic. The precursor is then mixed with a lithium salt such as, but not limited to LiOH, $Li_2O$, $LiNO_3$ or—especially—$Li_2CO_3$ followed by calcination.

When used in means for propulsion, for example aircrafts or vehicles, batteries have to meet very high safety standards. The safety requirements do not only refer to dependability under conditions like elevated temperature but also to inflammability and oxidizing behavior. Many batteries are being tested by the nail test—a nail is being driven through the battery and the behavior is observed—and under other extreme conditions.

Most lithium ion batteries contain an electrolyte that is based on one or more organic solvents that are inflammable. Reactions of the cathode active material with the electrolyte are of key relevance, and, in particular, exothermic reactions need to be studied. A commonly used test for studying potential reactions of the cathode active material with the electrolyte is the determination of the onset temperature by differential scanning calorimetry (DSC) performed on electrochemical cells or on their key components, especially on a combination of their cathode active material and the electrolyte.

Many measures can be considered to improve the safety behavior of lithium ion batteries. Flame-retardant additives for the electrolyte have been suggested, amendment of the set-up of the battery, and improvement of one or more of the components of the battery such as anode or in particular—cathode active material. However, the solutions suggested so far still leave room for improvement.

It was an objective of the present invention to provide electrochemical cells with an improved safety performance. It was further an objective of the present invention to provide components for electrochemical cells that help to improve the safety performance of electrochemical cells. It was further an objective of the present invention to provide a method for making components for electrochemical cells that help to improve the safety performance of electrochemical cells.

Accordingly, the process as defined at the outset has been found, hereinafter also referred to as inventive process or process according to the present invention.

BRIEF DESCRIPTION OF THE DRAWINGS

The FIGURE shows the DSC measurements of the onset temperature of inventive cathode active material CAM.1 and of comparative cathode active material C-CAM.2 ("reference").

The inventive process refers to a process for making a particulate material of general formula (I)

$$Li_{1+x}(Ni_aCo_bMn_cAl_d)_{1-x}O_2 \quad (I)$$

wherein
x is in the range of from 0.015 to 0.03,
a is in the range of from 0.3 to 0.6,
b is in the range of from 0.05 to 0.35, preferably from 0.15 to 0.25,
c is in the range of from 0.2 to 0.5, preferably up to 0.35,
d is in the range of from 0.001 to 0.03, preferably 0.01 to 0.03,
with a+b+c+d=1.

In one embodiment of the present invention, b is in the range of from 0.15 to 0.25 and c is in the range of from 0.2 to 0.35, with a+b+c+d=1.

The term "particulate" in the context with material of general formula (I) shall mean that said material is provided in the form of particles with a maximum particle diameter not exceeding 32 μm. Said maximum particle diameter can be determined by, e. g. sieving.

In one embodiment of the present invention, the particulate material of general formula (I) is comprised of spherical particles, that are particles have a spherical shape. Spherical particles shall include not just those which are exactly spherical but also those particles in which the maximum and minimum diameter of at least 90% (number average) of a representative sample differ by not more than 10%.

In one embodiment of the present invention, the particulate material of general formula (I) is comprised of secondary particles that are agglomerates of primary particles. Preferably, the particulate material of general formula (I) is comprised of spherical secondary particles that are agglomerates of primary particles. Even more preferably, the particulate material of general formula (I) is comprised of spherical secondary particles that are agglomerates of spherical primary particles or platelets.

In one embodiment of the present invention, the mean particle diameter (D50) of secondary particles of material of general formula (I) is in the range of from 6 to 12 µm, preferably 7 to 10 µm. The mean particle diameter (D50) in the context of the present invention refers to the median of the volume-based particle diameter, as can be determined, for example, by light scattering.

In one embodiment of the present invention, primary particles of particulate material of general formula (I) have an average diameter in the range from 1 to 2000 nm, preferably from 10 to 1000 nm, particularly preferably from 50 to 500 nm. The average primary particle diameter can, for example, be determined by SEM or TEM. SEM is an abbreviation of scanning electron microscopy, TEM is an abbreviation of transmission electron microscopy The inventive process comprises the following steps:
(a) co-precipitating a mixed hydroxide of nickel, cobalt and manganese from a solution of water-soluble salts of nickel, cobalt and manganese by contacting such solution with a solution of alkali metal hydroxide,
(b) adding an aqueous solution of an aluminate and thereby co-precipitating a layer of a mixed hydroxide of nickel and cobalt and manganese and aluminium on the particles formed in step (a),
(c) removing particles of $(Ni_aCo_bMn_cAl_d)(OH)_{2+d}$ so obtained and drying them in the presence of oxygen,
(d) mixing the particles obtained in step (c) with at least one Li compound selected from $Li_2O$, $LiOH$ and $Li_2CO_3$,
(e) calcining the mixture obtained according to step (d) at a temperature in the range of from 920 to 950° C.

The above steps (a) to (e) will be explained in more detail below.

Steps (a) to (e) of the inventive process are being performed in the order step (a), step (b), step (c), step (d) and step (e). They may be performed consecutively without substantial intermediate steps, or they may be performed with one or more intermediate steps.

Said mixed hydroxide of nickel, cobalt and manganese may, comprise counterions other than hydroxide, for example carbonate, sulfate, nitrate, carboxylate, especially acetate, or halide, especially chloride. A particularly preferred counterion, apart from hydroxide, is oxide, especially in combination with sulfate. It is possible for carbonate, sulfate, carboxylate or halide to be present in traces in mixed transition hydroxide of nickel, cobalt and manganese, for example of up to 1% by weight, based on hydroxide. Oxide may be present in greater proportions in mixed hydroxide of nickel, cobalt and manganese; for example, every tenth anion may be an oxide ion.

Said mixed hydroxide of nickel, cobalt and manganese may contain traces of other metal ions, for example traces of ubiquitous metals such as sodium, Ca or Zn, but such traces will not be taken into account in the description of the present invention. Traces in this context will mean amounts of 0.5 mol-% or less, referring to the total metal content of said mixed hydroxide of nickel, cobalt and manganese.

In step (a) of the inventive process, a solution containing water-soluble salts of nickel, cobalt and manganese is contacted with a solution of alkali metal hydroxide. An example of alkali metal hydroxides is lithium hydroxide, preferred is potassium hydroxide and even more preferred is sodium hydroxide.

Said contacting can be performed by simultaneously feeding a solution of alkali metal hydroxide and one or more solutions of water-soluble salts of nickel, cobalt and manganese into a vessel, preferably under stirring. It is preferred to perform such contacting by feeding a solution of alkali metal hydroxide and a solution containing water-soluble salts of each cobalt, nickel and manganese, in the molar ratio of said material of general formula (I).

Water-soluble in the context of the present invention shall mean that such salt has a solubility of at least 20 g/l in distilled water at 20° C., the amount of salt being determined under omission of crystal water and of water stemming from aquo complexes. Water-soluble salts of nickel, cobalt and manganese may preferably be the respective water-soluble salts of $Ni^{2+}$, $Co^{2+}$, and $Mn^{2+}$.

In one embodiment of the present invention, the step (a) of the inventive process is performed at temperatures in the range from 10 to 85° C., preferably at temperatures in the range from 20 to 60° C.

In one embodiment of the present invention, step (a) of the inventive process is performed at a pH value in the range from 8 to 12, preferably 10.5 to 12.0, more preferably 11.3 to 11.9, each measured in the mother liquor at 23° C.

In one embodiment of the present invention, the inventive process is performed at a pressure in the range from 500 mbar to 20 bar, preferably standard pressure.

In one embodiment of the present invention, an excess of precipitant is used, for example alkali metal hydroxide, based on transition metal. The molar excess may, for example, be in the range from 1.1:1 to 100:1. It is preferable to work with a stoichiometric proportion of precipitant.

In one embodiment of the present invention, aqueous solution of alkali metal hydroxide has a concentration of alkali metal hydroxide in the range from 1 to 50% by weight, preferably 10 to 25% by weight.

In one embodiment of the present invention, the concentrations of aqueous solution of nickel, cobalt, and manganese salts can be selected within wide ranges. Preferably, the concentrations are selected such that they are within the range of, in total, 1 to 1.8 mol of the transition metals/kg of solution, more preferably 1.5 to 1.7 mol of the transition metals/kg of solution. "The transition metal salts" used herein refers to the water-soluble salts of nickel, cobalt and manganese.

In one embodiment of the present invention, step (a) of the inventive process is performed in the presence of at least one compound L which may serve as a ligand for at least one of the transition metals, for example in the presence of at least one organic amine or especially of ammonia. In the context of the present invention, water should not be regarded as a ligand.

In one embodiment of the present invention, a concentration of L, especially of ammonia, within the range from 0.05 to 1 mol/l, preferably 0.1 to 0.7 mol/l, is selected. Particular preference is given to amounts of ammonia for which the solubility of $Ni^{2+}$ in the mother liquor is not more than 1000 ppm, more preferably not more than 500 ppm.

In one embodiment of the present invention, mixing is effected during step (a) of the inventive process, for example with a stirrer. Preference is given to introducing a stirrer output of at least 1 W/l into the reaction mixture, preferably at least 3 W/l and more preferably at least 5 W/l. In one embodiment of the present invention, a stirrer output of not more than 25 W/l can be introduced into the reaction mixture.

In a specific embodiment of the present invention, the procedure may be, in the case of batchwise process variants, to lower the stirrer output toward the end in batchwise operations.

In one embodiment of the present invention, mother liquor is drawn off during carrying out step (a) of the inventive process.

Step (a) of the inventive process can be performed in the presence or absence of one or more reducing agents. Examples of suitable reducing agents are hydrazine, ascorbic acid, glucose and alkali metal sulfites. It is preferable not to use any reducing agent in step (a).

Step (a) of the inventive process can be performed under air, under inert gas atmosphere, for example under noble gas or nitrogen atmosphere, or under reducing atmosphere. An example of a reducing gas is, for example, $SO_2$. Preference is given to working under inert gas atmosphere.

Step (a) of the inventive process furnishes a mixed hydroxide of nickel, cobalt, and manganese in the form of particles that are slurried in their mother liquor. Said particles may have an irregular or preferable a spherical shape. Spherical particles shall include not just those which are exactly spherical but also those particles in which the maximum and minimum diameter of at least 95% (number average) of a representative sample differ by not more than 5%.

In one embodiment of the present invention, step (a) has a duration of 1 to 40 hours, preferably of 2 to 30 hours.

In one embodiment of the present invention, each aqueous solution of water-soluble salts of nickel, cobalt and manganese on one hand and of solution of alkali metal hydroxide on the other hand are added at a constant rate, and aqueous solution of water-soluble salts of nickel, cobalt and manganese has a constant composition. In this embodiment, the distribution of the transition metals nickel, cobalt and manganese in particles formed in step (a) of the inventive process is homogeneous.

In alternative embodiments, the rates of addition of aqueous solution of water-soluble salts of nickel, cobalt and manganese on one hand and of solution of alkali metal hydroxide on the other hand are changed during step (a) of the inventive process, and/or the composition of the aqueous solution of water-soluble salts of nickel, cobalt and manganese is altered during step (a). In the latter embodiment, particles of mixed hydroxides may be obtained in which at least two of the transition metals exhibit a concentration gradient.

Step (b) of the inventive process is adding an aqueous solution of an aluminate and thereby co-precipitating a layer of a mixed hydroxide of nickel and cobalt and manganese and aluminium on the particles formed in step (a). The layer co-precipitated in step (b) thus contains a mixed hydroxide of nickel and cobalt and manganese and aluminium. The addition of solution of transition metals and of alkali metal hydroxide is continued during step (b).

In the context of the present invention, the term hydroxide of aluminum isused as idealized version of the respective hydroxide. They may also contain some oxide or be summarized as $Al_2O_3$.aq.

Aluminate can be selected from alkali metal aluminate, preferred is sodium aluminate, $NaAlO_2$.

In one embodiment of the present invention, aqueous solution of an aluminate has a concentration of from 1 to 300 g $Al^{3+}$/l.

In one embodiment of the present invention, aqueous solution of aluminate has a pH value about 14.

During the addition of aqueous solution of an aluminate in step (b), the addition of aqueous solution of water-soluble salts of nickel, cobalt and manganese is usually continued, for example at a reduced rate or a constant rate compared to step (a) before start of step (b).

During the addition of aqueous solution of an aluminate in step (b), the addition of solution of alkali metal hydroxide is usually continued, for example at a reduced rate or a constant rate or a higher rate compared to step (a) before start of step (b). It is preferred to maintain the pH value constant.

In one embodiment of the present invention, the addition of both aqueous solution of water-soluble salts of nickel, cobalt and manganese and solution of alkali metal hydroxide is being continued, at a reduced or higher speed compared to step (a) before start of step (b) or at the same rate as in step (a) before start of step (b). In embodiments wherein aluminate is added in step (b) the addition of solution of alkali metal hydroxide is being reduced in step (b). Preferably, the pH value is being maintained essentially constant during steps (a) and (b).

In order to avoid side-reactions, it is preferred to add aqueous solution of aluminate through a different inlet into the vessel in which step (a) was commenced.

In one embodiment of the present invention, step (b) has a duration of 10 minutes to 8 hours, preferably of 30 minutes to 6 hours. Even more preferably, step (b) has a duration of 5 to 30% of the duration of step (a).

Step (a) and step (b) are preferably performed in the same vessel.

In a preferred embodiment, step (a) and step (b) may be performed under the same conditions of pressure, temperature, and stirring.

Step (c) of the inventive process comprises removing particles of $(Ni_aCo_bMn_cAl_d)(OH)_{2+d}$ so obtained and drying them in the presence of oxygen.

Removal of particles of $(Ni_aCo_bMn_cAl_d)(OH)_{2+d}$ refers to removal of said particles from the respective mother liquor. The removal can be effected, for example, by filtration, centrifugation, decantation, spray drying or sedimentation, or by a combination of two or more of the aforementioned operations. Suitable apparatuses are, for example, filter presses, belt filters, spray dryers, hydrocyclones, inclined clarifiers or combinations of the aforementioned apparatuses.

Mother liquor refers to water, water-soluble salts and any further additives present in solution. Possible water-soluble salts are, for example, alkali metal salts of the counterions of the transition metals, for example sodium acetate, potassium acetate, sodium sulfate, potassium sulfate, sodium nitrate, potassium nitrate, sodium halide, especially sodium chloride, potassium halide, and also additional salts, any additives used, and any excess alkali metal hydroxide, and also ligand L. In addition, the mother liquor may comprise traces of soluble transition metal salts.

It is desirable to remove the particles as completely as possible.

As with the hydroxides of aluminum, the formula $(Ni_aCo_bMn_cAl_d)(OH)_{2+d}$ is to be viewed as idealized formulae.

After the actual removal, the particles of $(Ni_aCo_bMn_cAl_d)(OH)_{2+d}$ can be washed. Washing can be effected, for example, with pure water or with an aqueous solution of alkali metal carbonate or alkali metal hydroxide, especially with an aqueous solution of sodium carbonate, potassium carbonate, sodium hydroxide, potassium hydroxide or ammonia. Water and aqueous solution of alkali metal hydroxide, especially of sodium hydroxide, are preferred.

The washing can be effected, for example, with employment of elevated pressure or elevated temperature, for example 30 to 50° C. in another variant, the washing is performed at room temperature. The efficiency of the washing can be checked by analytical measures. For example, the content of transition metal(s) in the washing water can be analyzed.

If washing is effected with water rather than with an aqueous solution of alkali metal hydroxide, it is possible to check with the aid of conductivity studies on the washing water whether water-soluble substances, for example water-soluble salts, can still be washed out.

After removal, the particles of $(Ni_aCo_bMn_cAl_d)(OH)_{2+d}$ or $(Ni_aCo_bMn_cTi_d)(OH)_{2+2d}$ are dried in the presence of oxygen. Presence of oxygen in this context refers to the presence of oxygen gas. Presence of oxygen therefore includes an atmosphere of air, of pure oxygen, of mixtures from oxygen with air, and of air diluted with an inert gas such as nitrogen.

The drying can be performed, for example, at a temperature in the range from 30 to 150° C. If the drying is performed with air, it is observed in many cases that some transition metals are partially oxidized, for example $Mn^{2+}$ to $Mn^{4+}$ and $Co^{2+}$ to $Co^{3+}$, and blackening of the particles $(Ni_aCo_bMn_cAl_d)(OH)_{2+d}$ or $(Ni_aCo_bMn_cTi_d)(OH)_{2+2d}$ is observed.

To perform step (d) of the inventive process, the procedure may be, for example, to mix particles obtained in step (c) with at least one lithium compound selected from $Li_2O$, $LiOH$ and $Li_2CO_3$, water of crystallization being neglected in the context of the present invention. Preferred source of lithium is $Li_2CO_3$.

To perform step (d) of the inventive process, the amounts of particles obtained in step (c) and lithium compound are selected so as to obtain the stoichiometry of the desired material of formula (I), Preferably, particles obtained in step (c) and lithium compound(s) are selected such that the molar ratio of lithium to the sum of all transition metals and any M is in the range from 1.015:1 to 1.03:1, preferably 1.03:1 to 1.08:1, even more preferably 1.04:1 to 1.07:1.

To perform step (e) of the inventive process, the mixture obtained according to step (d) is being calcined at a temperature in the range of from 920 to 950° C.

Step (e) of the inventive process can be performed in a furnace, for example in a rotary tube furnace, in a muffle furnace, in a pendulum furnace, in a roller hearth furnace or in a push-through furnace. Combinations of two or more of the aforementioned furnaces are possible as well.

Step (e) of the inventive process can be performed over a period of 30 minutes to 24 hours, preferably 3 to 12 hours. Step (e) can be effected at a temperature level, or a temperature profile can be run.

In one embodiment of the present invention, step (e) is being performed in an oxygen-containing atmosphere. Oxygen-containing atmosphere includes an atmosphere of air, of pure oxygen, of mixtures from oxygen with air, and of air diluted with an inert gas such as nitrogen. In step (e), preferred is an atmosphere of oxygen or oxygen diluted with air or nitrogen and a minimum content of oxygen of 21 vol.-%. In one embodiment of the present invention, between steps (d) and (e) at least one pre-calcining step (e*) is being performed. Step (e*) comprises heating the mixture obtained in step (d) at a temperature in the range of from 300 to 700° C. for a period of 2 to 24 hours, and performing step (e) with the material obtained in step(s) (e*).

In one embodiment of the present invention, two pre-calcining steps are being performed between steps (d) and (e). Said two pre-calcining steps include heating the mixture obtained in step (d) at a temperature in the range of from 300 to 400° C. for a period of 2 to 12 hours, followed by heating the material so obtained at a temperature in the range of from 500 to 700° C. for a period of 2 to 12 hours.

During the temperature changes, a heating rate of 1 K/min up to 10 K/min can be obtained, preferred is 2 to 5 K/min.

During step (e), the hydroxide precursor is converted into particulate material of general formula (I). Without wishing to be bound by any theory, during step (e) the $Al^{3+}$-cations or the $Ti^{4+}$ cations, respectively, may diffuse freely within the particles. Transition metal ions diffuse much slower if at all.

After having performed step (e) of the inventive process, a particulate material according to formula (I) is obtained. Additional steps may be performed, such as cooling down the particulate material, or sieving in order to remove agglomerates with a particles diameter of more than 32 μm.

The particulate material obtained according to the inventive process is well suited as cathode active material. It combines good electrochemical behavior with a high onset temperature.

Another aspect of the present invention is a cathode active material, hereinafter also being referred to as "particulate material according to formula (I)", for a lithium ion battery, essentially consisting of particles of general formula (I)

$$Li_{1+x}(Ni_aCo_bMn_cAl_d)_{1-x}O_2 \qquad (I)$$

wherein
x is in the range of from 0.015 to 0.03,
a is in the range of from 0.3 to 0.6,
b is in the range of from 0.05 to 0.35, preferably from 0.15 to 0.25,
c is in the range of from 0.2 to 0.5, preferably up to 0.35,
d is in the range of from 0.001 to 0.03, preferably 0.01 to 0.03,
with a+b+c+d=1,
having an average particle diameter (D50) in the range of from 5 to 12 μm, wherein Al is homogeneously dispersed within said particles. In the context of the present invention, average particle diameter and mean particle diameter are used interchangeably.

One way to determine whether Al is homogeneously dispersed in particles of particulate material according to formula (I) is by SEM/EDX mapping.

In one embodiment of the present invention, b is in the range of from 0.15 to 0.25 and c is in the range of from 0.2 to 0.35, with a+b+c+d=1.

In one embodiment of the present invention, the onset temperature (DSC) of cathode active material according to the present invention is in the range of from 305° C. to 320° C., wherein said onset temperature is advantageously measured by differential scanning calorimetry (DSC). The onset temperature is advantageously determined as follows: the respective cathode material is first tested in an electrochemical cell. After having gone through a cycling program and after charging to a certain but identical voltage, the electrochemical cell is being disassembled, and the cathode composition is being removed from the current collector mechanically. It is then mixed with an electrolyte, preferably in a 1 M solution of $LiPF_6$ in a mixture of organic carbonates. Then, the resultant slurry is subjected to a differential scanning calorimetry (DSC) measurement. The onset temperature can be determined from the DSC measurement directly.

The inventive cathode active material essentially consists of particles general formula (I). In the context of the present invention, that means that the inventive cathode active material does not contain separate $Al_2O_3$ particles, determined by SEM or EDX or a combination of EDX and SEM. In the context of the present invention, "essentially consisting of" particles of general formula (I) shall include cathode active materials that contain less than 1 separate particle of $Al_2O_3$ per 100 particles of compound of general formula (I). Even more preferably, cathode materials according to the present invention do not contain detectable amounts of $Al_2O_3$ particles.

In one embodiment of the present invention inventive cathode active material contains in the range of from 0.01 to 2% by weight $Li_2CO_3$, determined as $Li_2CO_3$ and referring to said cathode active material.

In one embodiment of the present invention, the surface (BET) of inventive cathode active material is in the range of from 0.2 to 10 $m^2/g$, preferably from 0.3 to 1 $m^2/g$. The surface (BET) can be determined by nitrogen absorption, for example according to DIN 66131.

Inventive cathode active material may in particular serve as electrode material, especially for cathodes for lithium ion batteries.

A further aspect of the present invention are electrodes comprising at least one inventive cathode active material. They are particularly useful for lithium ion batteries. Lithium ion batteries comprising at least one electrode according to the present invention exhibit a very good discharge and cycling behavior, and they show good safety behavior.

In one embodiment of the present invention, inventive cathodes contain
(A) at least one cathode active material, as described above,
(B) carbon in an electrically conductive state, and
(C) a binder,
(D) a current collector.

In a preferred embodiment of the present invention, inventive cathodes contain
(A) 80 to 95% by weight cathode active material,
(B) 3 to 17% by weight of carbon,
(C) 3 to 10% by weight of binder material,
percentages referring to the sum of (A), (B) and (C).

Cathodes according to the present invention contain carbon in electrically conductive modification, in brief also referred to as carbon (B). Carbon (B) can be selected from soot, active carbon, carbon nanotubes, graphene, and graphite. Carbon (B) can be added as such during preparation of electrode materials according to the invention.

Electrodes according to the present invention can comprise further components. They can comprise a current collector (D), such as, but not limited to, an aluminum foil. They further comprise a binder material (C), hereinafter also referred to as binder (C). Current collector (D) is not further described here.

Suitable binders (C) are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co)polymers.

In a particularly preferred embodiment of the present invention, binder (C) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive electrodes may comprise 3 to 10% by weight of binder(s) (d), referring to the sum of component (a), component (b) and carbon (c).

A further aspect of the present invention is a battery, containing (1) at least one cathode comprising inventive cathode active material (A), carbon (B), and binder (C), (2) at least one anode, and (3) at least one electrolyte.

Embodiments of cathode (1) have been described above in detail.

Anode (2) may contain at least one anode active material, such as carbon (graphite), $TiO_2$, lithium titanium oxide, silicon or tin. Anode (2) may additionally contain a current collector, for example a metal foil such as a copper foil.

Electrolyte (3) may comprise at least one non-aqueous solvent, at least one electrolyte salt and, optionally, additives.

Nonaqueous solvents for electrolyte (3) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (II) and (III)

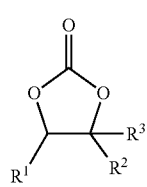

(II)

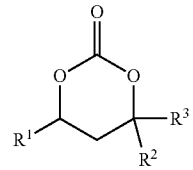

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

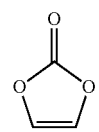

(IV)

The solvent or solvents is/are preferably used in the water-free state, i.e. with a water content in the range from 1 ppm to 0.1% by weight, which can be determined, for example, by Karl-Fischer titration.

Electrolyte (3) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In a preferred embodiment of the present invention, electrolyte (3) contains at least one flame retardant. Useful flame retardants may be selected from trialkyl phosphates, said alkyl being different or identical, triaryl phosphates, alkyl dialkyl phosphonates, and halogenated trialkyl phosphates. Preferred are tri-$C_1$-$C_4$-alkyl phosphates, said $C_1$-$C_4$-alkyls being different or identical, tribenzyl phosphate, biphenyl phosphate, $C_1$-$C_4$-alkyl di-$C_1$-$C_4$-alkyl phosphonates, and fluorinated tri-$C_1$-$C_4$-alkyl phosphates, In a preferred embodiment, electrolyte (3) comprises at least one flame retardant selected from trimethyl phosphate, $CH_3$—P(O)$(OCH_3)_2$, triphenylphosphate, and tris-(2,2,2-trifluoroethyl)phosphate.

Electrolyte (3) may contain 1 to 10% by weight of flame retardant, based on the total amount of electrolyte.

In an embodiment of the present invention, batteries according to the invention comprise one or more separators (4) by means of which the electrodes are mechanically separated. Suitable separators (4) are polymer films, in particular porous polymer films, which are unreactive toward metallic lithium. Particularly suitable materials for separators (4) are polyolefins, in particular film-forming porous polyethylene and film-forming porous polypropylene.

Separators (4) composed of polyolefin, in particular polyethylene or polypropylene, can have a porosity in the range from 35 to 45%. Suitable pore diameters are, for example, in the range from 30 to 500 nm.

In another embodiment of the present invention, separators (4) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk. In one variant, a metal foil configured as a pouch is used as housing.

Batteries according to the invention provide a very good discharge and cycling behavior, in particular at high temperatures (45° C. or higher, for example up to 60° C.) in particular with respect to the capacity loss.

Batteries according to the invention can comprise two or more electrochemical cells that combined with one another, for example can be connected in series or connected in parallel. Connection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by working examples.

EXAMPLES

The measurement of the onset temperature was performed as follows:

The respective electrochemical cell was first tested in a cycling program: An electrochemical cell was charged to a given voltage with 0.1 C in CC-CV mode and was held in a charged state until the current dropped to at least 0.003 C. Then the electrochemical cell was discharged to 3V in CC mode. Then the electrochemical cell was again charged to a given voltage in CC-CV mode and was held at the given voltage until the current has reached 0.003 C. Then, the respective electrochemical cell was disassembled under an atmosphere of argon, and the cathode composition was mechanically removed from the current collector.

An amount of 10 mg of cathode composition—cathode active material, conductive carbon and binder were then mixed with 3 mg of electrolyte E-2, consisting of a 1 M solution of $LiPF_6$ in ethylene carbonate/dimethyl carbonate 1:1 by mass. The resulting slurry was then subjected to differential scanning calorimetry over a temperature range from 25 to 400° C., heating rate: 5 K/min. The results are shown in the FIGURE.

I. Synthesis of Precursors

The term "solution" refers to aqueous solutions unless specified otherwise.

I.1 Synthesis of a Precursor TM-OH.1

A 9-l-stirred reactor with overflow for removing mother liquor was filled with distilled water and 36.7 g of ammonium sulfate per kg of water. The solution was heated to 45° C. and the pH value was adjusted to 11.6 by adding an aqueous 25 wt. % of sodium hydroxide solution.

The precipitation reaction was started by the simultaneous feed of an aqueous transition metal solution and an alkaline precipitation agent at a flow rate ratio of 1.84, and a total flow rate resulting in a residence time of 7.7 hours. The transition metal solution contained Ni, Co and Mn at a molar ratio of 5:2:3 and a total transition metal concentration of 1.65 mol/kg. The alkaline precipitation agent consisted of 25 wt. % sodium hydroxide solution and 25 wt. % ammonia solution in a weight ratio of 8.29. The pH was kept at 11.6 by the separate feed of 25 wt. % sodium hydroxide solution. Beginning with the start-up of all feeds, mother liquor was removed so that the liquid level in the reactor stayed constant. After 20.5 hours of precipitation, an aqueous solution of 36.5 g of sodium aluminate per kg of water was added at a flow rate ratio of 0.21 compared to the flow of transition metal solution, while the feed of transition metal solution was continued at the same rate. The feed of sodium hydroxide solution was reduced by 1.2%. The pH value remained constant. After 26.5 hours all additions of solutions were stopped. Precursor TM-OH.1 was obtained by filtration of the resulting suspension, washed with distilled water, drying at 120° C. in air over a period of 12 hours and sieving.

I.2 Precursor for Comparative Experiments C-TM-OH.2

The precursor for comparative experiments was a transition metal hydroxide of the formula $Ni_{0.5}Co_{0.2}Mn_{0.3}(OH)_2$ that was made without addition of sodium aluminate. It basically did not contain aluminum hydroxide.

Precursor C-TM-OH.2 was dried at 120° C. in air over a period of 12 hours.

II. Synthesis of Cathode Active Materials

II.1 Synthesis of a Cathode Active Material According to the Invention

Precursor TM.OH.1 was mixed with $Li_2CO_3$ so that the ratio of Li to metals other than lithium was 1.05 to 1. The mixture so obtained was then calcined in a muffle type furnace under the following conditions:

Heating Rate: 3 K/Min

300° C. 6 hours, 600° C. 6 hours, 920° C. 6 hours.

After the calcination program the material so obtained was cooled, deagglomerated in an agate mortar and sieved through a sieve with 32 μm mesh size.

Inventive cathode active material CAM.1 was obtained.

II.2 Synthesis of a Comparative Cathode Active Material

Precursor C-TM.OH.2 was mixed with $Li_2CO_3$ so that the ratio of Li to metals other than lithium was 1.08 to 1. The mixture so obtained was then calcined in a muffle type furnace under the following conditions:

From room temperature to 350° C. in 2.7 K/min hold at 350° C. for 4 hours, from 350° C. to 650° C. in 1.3 K/min hold at 650° C. for 4 hours, from 650° C. to 900° C. in 1 K/min step, hold at 900° C. for 6 hours.

After the calcination program the material so obtained was cooled, deagglomerated in an agate mortar and sieved through a sieve with 32 μm mesh size.

Comparative cathode active material C-CAM.2 was obtained.

III. Making and Testing Electrochemical Cells

To produce a cathode (a.1), the following ingredients were blended with one another: 88 g of active materials 6 g polyvinylidene difluoride, ("PVdF"), commercially available as Kynar Flex® 2801 from Arkema Group, 3 g carbon black, (c.1), BET surface area of 62 m²/g, commercially available as "Super C 65L" from Timcal, 3 g graphite, commercially available as KS6 from Timcal.

While stirring, a sufficient amount of N-methylpyrrolidone (NMP) was added and the mixture was stirred with an Ultraturrax until a stiff, lump-free paste had been obtained.

Cathodes were prepared as follows: On a 30 μm thick aluminum foil, the above paste was applied with a 15 μm doctor blade. The loading after drying was 2 mA·h/cm². The loaded foil was dried overnight in a vacuum oven at 105° C. After cooling to room temperature in a hood disc-shaped cathodes were punched out of the foil. The cathode discs were then weighed and introduced into an argon glove box, where they are again vacuum-dried. Then, cells with the cathode discs were built.

Electrochemical testing was conducted in "TC1" coin type cells. The electrolyte (c.1) used was a 1 M solution of LiPF$_6$ in ethyl methyl carbonate/ethylene carbonate (volume ratio 1:1).

Separator: glass fiber. Anode: lithium. Potential range of the cell: 3 V-4.3 V.

| Material | C/5 Discharge/mA · h/g | 5 C Discharge/mA · h/g |
|---|---|---|
| C-CAM.2 | 163 | 126 |
| CAM.1 | 161 | 111 |

The invention claimed is:

1. A cathode active material, comprising particles of formula (I);

$$Li_{1+x}(Ni_aCo_bMn_cAl_d)_{1-x}O_2 \qquad (I),$$

wherein:

x is in the range of from 0.015 to 0.03, a is in the range of from 0.3 to 0.6, b is in the range of from 0.05 to 0.35, c is in the range of from 0.2 to 0.5, d is in the range of from 0.001 to 0.03, a+b+c+d=1, wherein the Al is homogeneously dispersed within the particles, and the particles have an average particle diameter D50 ranging from 5 μm to 12 μm, and wherein the cathode active material has a BET surface area ranging from greater than or equal to 0.2 m²/g to less than 10 m²/g, as determined by nitrogen absorption according to DIN 66131, and wherein the cathode active material comprises from 0.01% to 2% Li$_2$CO$_3$ by weight.

2. The cathode active material according to claim 1, wherein in the formula (I):

b is in the range of from 0.15 to 0.25, and c is in the range of from 0.2 to 0.35.

3. The cathode active material according to claim 1, having an onset temperature measured by differential scanning calorimetry in the range of from 305° C. to 325° C.

4. A cathode, comprising:

(A) at least one cathode active material according to claim 1, (B) carbon in electrically conductive form, (C) a binder material, and (D) a current collector.

5. The cathode according to claim 4, comprising:

80% to 95% by weight of the at least one cathode active material (A),

3% to 17% by weight of the carbon (B), and

3% to 10% by weight of the binder material (C), relative to a total weight of (A), (B) and (C).

6. An electrochemical cell, comprising at least one cathode according to claim 4.

7. The electrochemical cell according to claim 6, further comprising an electrolyte comprising at least one flame retardant chosen from trimethyl phosphate, CH$_3$—P(O)(OCH$_3$)$_2$, triphenylphosphate, and tris-(2,2,2-trifluoroethyl) phosphate.

8. The cathode active material according to claim 1, wherein the cathode active material comprises less than 1 separate particle of Al$_2$O$_3$ per 100 particles of compound of general formula (I).

* * * * *